US009833870B2

(12) United States Patent
Cho et al.

(10) Patent No.: US 9,833,870 B2
(45) Date of Patent: Dec. 5, 2017

(54) SUPERABRASIVE TOOL WITH METAL MESH STRESS STABILIZER BETWEEN SUPERABRASIVE AND SUBSTRATE LAYERS

(71) Applicant: ADICO CO, LTD, Kyungki-do (KR)

(72) Inventors: Hyun Sam Cho, Salt Lake City, UT (US); Kyungyul Han, Kyungki-do (KR); Hyeang Sup Lee, Kyungki-do (KR); Sook Young An, Kyungki-do (KR)

(73) Assignee: Adico Co, LTD, Kyungki-Do (KR)

( * ) Notice: Subject to any disclaimer, the term of this patent is extended or adjusted under 35 U.S.C. 154(b) by 0 days.

(21) Appl. No.: 14/358,383

(22) PCT Filed: Mar. 21, 2014

(86) PCT No.: PCT/US2014/031416
§ 371 (c)(1),
(2) Date: May 15, 2014

(87) PCT Pub. No.: WO2014/186050
PCT Pub. Date: Nov. 20, 2014

(65) Prior Publication Data
US 2016/0052099 A1 Feb. 25, 2016

Related U.S. Application Data

(60) Provisional application No. 61/823,813, filed on May 15, 2013.

(51) Int. Cl.
*B24B 3/10* (2006.01)
*B32B 15/02* (2006.01)
(Continued)

(52) U.S. Cl.
CPC ............ *B24B 3/10* (2013.01); *B24D 99/005* (2013.01); *B32B 3/266* (2013.01); *B32B 15/02* (2013.01);
(Continued)

(58) Field of Classification Search
CPC ... B24D 99/005; B32B 15/02; B32B 2307/50; B32B 2307/704; B32B 3/266; E21B 10/5735; B24B 3/10
See application file for complete search history.

(56) References Cited

U.S. PATENT DOCUMENTS 3,745,623 A * 7/1973 Wentorf, Jr. ............. B01J 3/062
407/119
4,629,373 A * 12/1986 Hall ...................... B23B 27/146
175/434

(Continued)

OTHER PUBLICATIONS

PCT Application PCT/US14/31416; Filing date Mar. 21, 2014; Adico Co, LTD; International SearchReport dated Aug. 21, 2014.

*Primary Examiner* — Marc Carlson
(74) *Attorney, Agent, or Firm* — Thorpe North & Western, LLP

(57) ABSTRACT

A multi-layer polycrystalline superabrasive PCD or PCBN blank for attachment to a working tool is disclosed. The blank comprises an abrasive layer of PCD or PCBN and a substrate layer of cobalt containing cemented tungsten carbide. In between the abrasive and substrate layers is a metal mesh stabilizer layer sintered by HPHT to the abrasive and substrate layers. The apertures of the mesh layer contain PCD or PCBN which, along with the mesh are sintered to the support and substrate layers and cobalt present in the substrate layer is infiltrated through the mesh layer into the abrasive layer as a binder. The metal mesh layer provides stability to the abrasive and substrate layers which have different stress and thermal expansion properties.

14 Claims, 3 Drawing Sheets

(51) Int. Cl.
*B32B 3/26* (2006.01)
*E21B 10/573* (2006.01)
*B24D 99/00* (2010.01)

(52) U.S. Cl.
CPC ...... *E21B 10/5735* (2013.01); *B32B 2307/50* (2013.01); *B32B 2307/704* (2013.01)

(56) References Cited

U.S. PATENT DOCUMENTS

| | | | | |
|---|---|---|---|---|
| 5,011,515 A * | 4/1991 | Frushour | | B22F 7/06 175/420.2 |
| 6,068,913 A * | 5/2000 | Cho | | B01J 3/062 175/434 |
| 6,083,570 A * | 7/2000 | Lemelson | | A63C 1/30 427/249.14 |
| 7,377,341 B2 * | 5/2008 | Middlemiss | | B22F 7/062 175/374 |
| 7,585,342 B2 | 9/2009 | Cho | | |
| 8,985,248 B2 * | 3/2015 | DiGiovanni | | E21B 10/5676 175/434 |
| 2004/0112359 A1* | 6/2004 | Sung | | B01J 3/062 125/15 |
| 2005/0050801 A1* | 3/2005 | Cho | | B22F 7/008 51/293 |
| 2005/0112396 A1* | 5/2005 | Sue | | B22F 7/06 428/549 |
| 2005/0210755 A1* | 9/2005 | Cho | | B21C 3/025 51/293 |
| 2006/0272571 A1* | 12/2006 | Cho | | B01J 3/062 117/84 |
| 2007/0034416 A1* | 2/2007 | Cho | | B22F 7/062 175/434 |
| 2008/0023230 A1* | 1/2008 | Cho | | B23B 51/02 175/432 |
| 2009/0173547 A1* | 7/2009 | Voronin | | B22F 7/062 175/375 |
| 2010/0206639 A1 | 8/2010 | Lockwood | | |
| 2010/0300767 A1* | 12/2010 | Cariveau | | B22F 7/08 175/432 |
| 2011/0042148 A1* | 2/2011 | Schmitz | | B24D 99/005 175/428 |
| 2012/0005966 A1* | 1/2012 | Cleboski | | E21B 10/46 51/295 |
| 2012/0018223 A1* | 1/2012 | Setlur | | B22F 7/08 175/57 |
| 2012/0080239 A1* | 4/2012 | Lyons | | B24D 99/005 175/428 |
| 2012/0222363 A1* | 9/2012 | DiGiovanni | | B24D 3/14 51/296 |
| 2012/0225277 A1* | 9/2012 | Scott | | C22C 26/00 428/309.9 |
| 2012/0261197 A1* | 10/2012 | Miess | | B01J 3/062 175/432 |
| 2013/0068535 A1* | 3/2013 | DiGiovanni | | E21B 10/567 175/428 |
| 2013/0330139 A1* | 12/2013 | De Reynal | | B24D 18/0009 408/22 |

* cited by examiner

US 9,833,870 B2

SUPERABRASIVE TOOL WITH METAL MESH STRESS STABILIZER BETWEEN SUPERABRASIVE AND SUBSTRATE LAYERS

RELATED APPLICATION

This application claims priority to U.S. Provisional Application No. 61/823,813, filed May 15, 2013, which is incorporated herein by reference.

FIELD OF THE INVENTION

The present invention relates to blanks for attachment to cutting tools wherein the blank comprises a superabrasive layer formed of polycrystalline diamond (PCD) or polycrystalline cubic boron nitride (PCBN), and an opposing substrate layer, typically formed of tungsten carbide (WC), wherein these layers are interconnected by being bonded to an intermediate stress stabilizer layer comprising a metal mesh containing PCD or PCBN in the mesh apertures. The present invention also relates to a process for the manufacture of such blanks.

More particularly this invention relates to a blanks for attachment to cutting tools wherein, in the blank the PCD or PCBN in between the metal mesh apertures of the intermediate layer is treated under high pressure high temperature (HPHT) sintering conditions such that a composite of PCD or PCBN and metal mesh is formed and is firmly bonded with the substrate and abrasive layers.

BACKGROUND OF THE INVENTION

It is well known in the superabrasive industry that composite polycrystalline superabrasive masses or compacts composed of diamond or cubic boron nitride ("CBN") crystals are widely used in industry as cutting elements in cutting or dressing tools, wire drawing dies and drill bits.

Most HPHT processed superabrasive cutting materials, such as PCD and PCBN compact products, are prepared by being sintered onto a cobalt cemented WC substrate. This WC substrate provides a strong support layer due to its unique beneficial effect on PCD and PCBN thereby providing a blank comprising a PCD or PCBN layer firmly cemented at its interface to a WC-substrate layer. Such blanks can then be processed into forms or shapes suitable for their intended purposes as various superabrasive tools.

This commercially available cobalt (10-25 wt %) cemented tungsten carbide plays a vital role as a substrate layer for the sintering of PCD or PCBN abrasive layers and for promoting a primary diamond-diamond bonding microstructure in a PCD compact or a CBN-CBN bonding microstructure in a PCBN compact under HPHT conditions such as exemplified in Wentorf, U.S. Pat. No. 3,745,623. For example, cobalt infiltrated from a WC-substrate contributes as a binder for creating strong chemical diamond-diamond bonds having a desirable microstructure of PCD which is important to obtain optimum engineering properties in the formation of superabrasive cutting tools. It is also generally known that cobalt from a tungsten carbide substrate layer plays an important binder assisting role for direct CBN-CBN bonding in the formation of PCBN superabrasives on a substrate layer. Such may also apply as well for partly or indirectly binder-CBN bonding to a substrate layer, depending on the grades of PCBN products.

However, there may unfortunately be adverse effects to one or more of the engineering properties of PCD and PCBN abrasive layers bonded to a cemented WC-substrate layer in more detailed engineering structural perspectives.

One adverse effect to PCD or PCBN abrasives bonded to cemented WC-substrates is related to the residual stress generated at the PCD/WC or PCBN/WC interface during the HPHT PCD/PCBN sintering process which will directly influence the overall internal bulk stress inside the PCD or PCBN layer. Simply, the generation of residual stress at the interface of PCD or PCBN layer and the WC-substrate layer results from the strong HPHT joining of two different materials of different thermal properties even under the very high pressures and temperatures of the PCD/PCBN manufacturing process. Differences in thermal expansion and contraction in between the superabrasive (PCD or PCBN) and the tungsten carbide at the interface under stringent pressure and temperature, such as 50,000 atms and 1400° C. results in the formation of considerable amounts of residual stress in the PCD/WC or PCBN/WC interface. Furthermore, such differences directly influence the overall internal bulk stress on the PCD or PCBN layer.

Also, this undesirable overloaded internal stress on the PCD/PCBN layer is highly negatively influential to the additional tensile stress of PCD or PCBN during the follow-up post-pressing operations on PCD or PCBN for the final cutting tool manufacturing operations. For example in laser cutting into the PCD/PCBN segments, brazing as-cut PCD/PCBN segment into the tool body, and brazed PCD/PCBN tool shaping steps, such internal stress may induce cracks or fractures in either PCD/PCBN layer or at its interface with the WC substrate.

Middlemiss, U.S. Pat. No. 7,377,341 teaches a compact comprising an ultrahard abrasive joined to a substrate through an intermediate layer which allegedly provides improved matching of thermal expansion characteristics between the ultrahard material and substrate. Such intermediate layer can be provided as a preformed layer, such as a foil, or a green-state part which is joined to the ultrahard abrasive layer and substrate through HPHT processing.

Cho, U.S. Pat. No. 6,068,913 teaches the use of a corrugated intermediate superabrasive layer of PCD of high cobalt content which interconnects with the corrugated region of a corrugated tungsten carbide substrate layer for the purpose of forming a stress buffer area in between tungsten carbide substrate and the primary PCD abrasive layer.

Cho, U.S. Pat. No. 7,585,342 teaches a metal diffusion bridge matrix embedded in a superabrasive PCD or PCBN layer for bolstering bulk toughness and increasing wear resistance in the working superabrasive PCD or PCBN layer. Also taught is that such matrix, during HPHT processing, may form a metallic layer between the superabrasive and substrate layers which can serve to minimize inherent residual stress caused by the bonding of the dissimilar superabrasive and substrate materials.

While the above patents tend to offer some relief or solution to the residual stress problem inherent in the bonding of dissimilar materials of the superabrasive and substrate, there still remains a need for additional improvement.

SUMMARY OF THE INVENTION

In accordance with the present invention, there is provided a new blank for configuration and attachment to cutting tools comprising a PCD or PCBN superabrasive layer interconnected to a WC-substrate layer through a metal mesh stress stabilizer layer which provides for reduced residual stress between the abrasive and substrate layers and which also results in a blank which is less vulnerable to post-pressing related fracture of PCD and PCBN as well as its final product service when attached to a tool and a method for making the same. The new blank comprises a PCD or PCBN superabrasive layer and a tungsten carbide substrate layer bonded at an interface between PCD/PCBN and tungsten-carbide substrate layers by a metal mesh stress stabilizer having PCD or PCBN in the mesh apertures. The metal mesh comprises or consists of a carbide former and can be chosen from the groups IVA, VA, VIA, or alloys thereof. Tungsten, molybdenum, and tantalum are particularly useful metals for the mesh with tungsten or molybdenum being most commonly used. Metal mesh formed of molybdenum, tungsten, tantalum, zirconium, and niobium can be particularly suitable. For purposes of illustration, tungsten or molybdenum will be referred to throughout this disclosure but the other metals referred to may also be used in place thereof unless expressly excluded.

The PCD and PCBN blanks prepared herein containing the stress reducing mesh metal infiltrated with PCD or PCBN inserted between the PCD/PCBN superabrasive and the cobalt containing tungsten carbide substrate layers and treated under conventional HPHT conditions are considerably less vulnerable to dangers of fracturing the PCD and PCBN layers during both HPHT sintering processes and subsequent finishing processes of the PCD/PCBN blanks into tip-segments for inserting into cutting tools or other tools.

It is to be noted that the magnitude of residual stress present at the PCD/PCBN and substrate interface depends on the physical geometry and size of the HPHT sintered PCD/PCBN-intermediate metal mesh-substrate blank such as diameter and total thickness of the PCD/PCBN blank product. In general, the blank may have an overall length or thickness of between about 1.0 and 5.0 mm with the superabrasive PCD or PCBN layer having a thickness of about 0.3 to 1.2 mm. The metal mesh will typically have a thickness of about 0.15 to 0.20 mm and the tungsten carbide substrate layer can often have a thickness of about 0.7 mm to 4.7 mm. The total or combined thickness of these layers comprises the length of the blank. The diameter of the blank will usually vary between about 30-75 mm. These measurements are exemplary only and the only limitation will be that of functionality and available equipment.

For example, larger diameter blanks of about 50 mm and above with thinner blanks of about 1.6 mm or less tend to be more fragile and hence more susceptible to fracturing of the PCD or PCBN layer as compared to superabrasives blanks having a diameter of between 30 mm and 50 mm and a blank thickness thicker than 1.6 mm. In this case, even blanks of 50 mm in diameter and having a blank thickness of 1.6 mm or less have routinely been shown to be more susceptible to fracturing of PCD or PCBN layers. Furthermore, PCD or PCBN layers thicker than about 0.70 mm are also more vulnerable to crack or fracture as compared to more preferable PCD or PCBN layers having a thickness of between about 0.50 to 0.70 mm. Also, in some instances the abrasive PCD or PCBN layers can be as thin as 0.30 to 0.50 mm for forming blanks for special products. As noted above these dimensions are exemplary only and one skilled in the art can formulate blanks as are optimal for the uses for which they are to be put.

The metal mesh stress stabilizer, which functions to reduce stress at the interface of the abrasive and substrate layers can comprise a tungsten or molybdenum mesh at the interface between PCD and WC or PCBN and WC substrate layers. The thickness of the metal mesh can often be between about 0.15 and 0.20 mm thick and the shape of the mesh apertures can be any functional shape such as that of a hexagon, diamond, circle, rectangle, square, oval, and the like. The mesh apertures are typically distributed substantially uniformly across the metal mesh. Into these apertures is inserted PCD or PCBN particles which can be sintered into place securing the metal mesh to the abrasive and substrate layers. The PCD or PCBN sintered in the metal mesh is typically infiltrated by cobalt. The mesh area does not occupy the entire surface area between the abrasive and substrate layers to be joined. The mesh occupied area is typically more than 40% but less than 70%, of surface area between these layers. Further, the metal mesh can typically extend from about 5% to about 25% of the thickness of the superabrasive layer.

In accordance with an additional aspect of the invention, either a second mesh layer or a thin metal (Mo, W) can be added in order to optimize the stress distribution at the interface of the abrasive and substrate layers to provide improved product yield. By doing this, the infiltration of cobalt to PCD or PCBN layer from the cobalt cemented WC-substrate layer can also be optimized empirically if needed based on the disclosure herein.

In accordance with the above, a PCD or PCBN blank made with a stress stabilizer according to the present invention typically has less curvature and is less bowed than conventional PCD or PCBN blanks finished at the final blank thickness. Also, the rate of breakage or fracture of blanks as described herein is considerably lower than in normal or conventional PCD blanks.

In addition, another further significant improvement of this invention is the additional benefit attributed to the metal mesh layer at the abrasive WC-substrate interface. This benefit is thought to be the result of a possible scavenging effect by transient metals or any other unknown toxics or impurities migrating from the WC-substrate layer and captured by the metal mesh stress reducing layer. The migration of transient metals or other toxics from the substrate layer to the abrasive layer is detrimental to HPHT processing of the PCD or PCBN blank. Unfortunately, the control of internal properties or impurities in a cobalt containing WC-disc, to be used for the manufacture of PCD or PCBN blanks, is normally out of control of the PCD or PCBN blank manufacturer and quality control is always a delicate concern for how to overcome this difficult issue to provide for both better product quality and higher process yield.

Thus, this invention allows for reduction or elimination of undesirable stress related problems by providing a new HPHT cell design resulting in the improvement of stress distribution at the interface of PCD or PCBN and substrate layers. This is obtained by reducing residual stress at the interface by the incorporation of an intermediate metal mesh stress stabilizer containing a combined and sintered PCD or PCBN metal mesh layer wherein the PCD or PCBN is contained in the mesh apertures and processed by HPHT into a sintered abrasive/metal disc. The sintered abrasive/metal intermediate disc is further bonded to the abrasive and substrate layers by the HPHT processing.

DETAILED DESCRIPTION OF THE INVENTION

Figure 1:
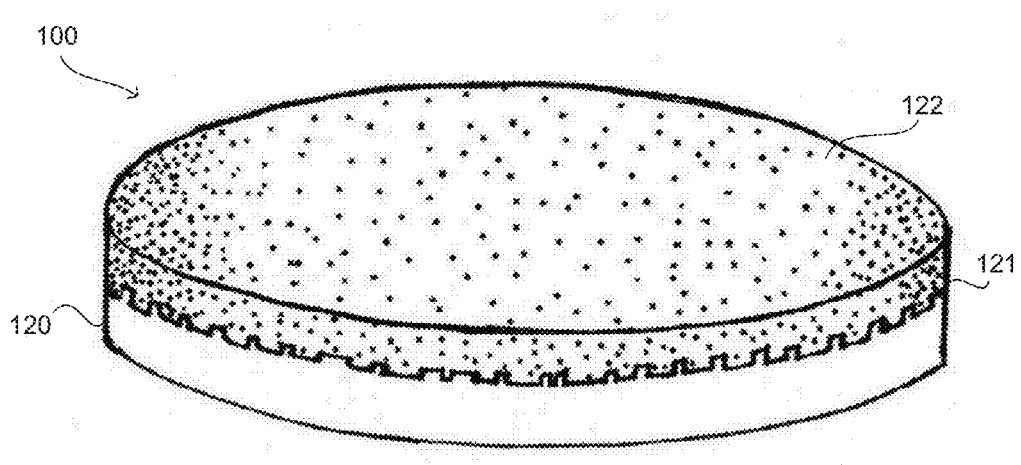
FIG. 1 is a schematic drawing of a PCD or PDCB blank disc 100 showing an abrasive layer 122, a metal mesh stress reducing layer 121 and a substrate layer 120.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a substrate" includes one or more of such substrates, and reference to "a layer" includes reference to one or more of such layers.

As used herein, unless referring to prior art, the term blank refers to a three layer segment comprising a PCD or PCBN superabrasive layer joined at its interface to a cobalt containing tungsten carbide substrate layer by an intermediate layer of a stress reducing metal mesh wherein the mesh apertures contain PCD or PCBN infiltrated by cobalt.

As used herein "mesh" refers to an apertured material comprising cords, wires, or threads woven into a network defining the apertures or a solid sheet having apertures cut, punched, or otherwise formed therein. The mesh may be flexible or rigid and the apertures are typically of uniform size and spacing.

As used herein, "superabrasive" refers to abrasive materials which are ultrahard such as diamond, CBN and polycrystalline diamond (PCD) or CBN (PCBN). Further, the terms superabrasive and PCD are often used interchangeably herein unless the context specifically indicates otherwise. Such PCD and PCBN materials are formed of a sintered, bonded and continuous interconnected mass of diamond or CBN and specifically exclude metal bonded abrasives where abrasives are suspended within a metal matrix and bonded thereby.

As used herein, "bonded", "bonding", and the like refer to carbide bonding, nitride bonding, boride bonding, mechanical bonding, and/or sintering of superabrasive particles. For example, diamond superabrasive particles can be bonded using a sintering aid such as cobalt to form a polycrystalline structure. Further, the addition of carbide and/or nitride formers such as titanium can provide for formation of chemical bonds between the diamond, CBN, and/or other components of the superabrasive layer to form a bonded mass of superabrasives.

As used herein, "forming", when used in conjunction with superabrasive layers, refers to attaching a superabrasive layer to a surface. As such, the superabrasive layer can be provided as a powdered mass which is then shaped or otherwise formed into a coherent mass directly on the substrate. Alternatively, the superabrasive layer can be formed on a surface by providing a coherent, partially sintered, or sintered superabrasive layer which is independently produced and then "formed" on the surface by adhesion, brazing or other like methods.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, "high pressure" and "high temperature" refer to pressures and temperatures within the stability field of diamond or CBN. These pressures and temperatures can vary widely and are well known to those skilled in the art. For example, as pressures increase, lower temperatures can be used to successfully sinter diamond and CBN. Typical pressures can range from about 1 GPa to about 7 GPa and temperatures often range from about 1,200° C. to about 1,500° C. Those skilled in the art will recognize that conditions outside these ranges can be used depending on the apparatus and specific superabrasive properties, e.g., particle size, added components, etc., and such are considered within the scope of the present invention.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5, etc. This same principle applies to ranges reciting only one numerical value. Furthermore, such an interpretation should apply regardless of the breadth of the range or the characteristics being described.

As compared to a conventional blank of a PCD or PCBN abrasive layer sintered directly to a cobalt containing tungsten carbide substrate, the present invention provides improved cobalt infiltration from the substrate to the abrasive layer by the presence of the metal mesh stress stabilizer between these two layers during the HPHT sintering process. More importantly, the metallurgical morphology, or homogeneity of microstructure, at the interface of the tungsten carbide layer is improved by the presence of the metal mesh layer as compared to a conventional blank. In a conventional blank, without the presence of the metal mesh stress stabilizer, the surface of the tungsten carbide substrate directly interfaced with the abrasive particles of the abrasive layer, would be relatively inhomogeneous and have a rough muddy microstructure after cobalt is diffused out of the tungsten carbide layer at the start of the cooling stage of the final sintering process.

In other words, it is reasonably probable that, if this putty interface area of non-uniform microstructure is left after the HPHT sintering operation, the thermophysical as well as thermomechanical properties and their resulting behavior at this interface area would not be desirable. The mechanical properties, such as becoming more brittle than ductile, can be more prevalent, especially under the stress-induced environments.

However, with the presence of the transient metal-mesh layer at this affected interface area right next to a tungsten carbide substrate, morphology in such area can be restored, and even enhanced, to exhibit more ductile behavior than brittle behavior. Moreover, the functioning of the tungsten carbide at the interface can be more stable under the localized stresses such as in the cooling stage of the HPHT sintering process. In addition, due to the metal mesh next to the tungsten carbide substrate layer, the degree of damaged area can be significantly less because cobalt infiltration will be much smoother than in the conventional case since the metal mesh promotes cobalt diffusion more smoothly and uniformly into the abrasive PCD or PCBN layer by a percolating effect through a surface of the metal mesh. By the presence of the metal mesh stabilizer, the overall PCD or PCBN layer quality is more homogeneous from a microstructure standpoint and also the internal stress of this PCD or PCBN is more stabilized than with conventional PCD or PCBN blanks.

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Referring to FIG. 1, there is shown a perspective view of a three layer PCD or PCBN blank 100, of the present invention. The blank 100 has a substrate layer 120, which is typically cobalt cemented tungsten carbide. Opposite the substrate layer 120 is an abrasive PCD or PCBN layer 122. A metal mesh stress reducing layer 121 containing PCD or PCBN in the apertures thereof and infiltrated by cobalt is sintered between the substrate layer 120 and the abrasive PCD or PCBN polycrystalline outer working layer 122. Cobalt is an extremely good binder agent and during HPHT processing firmly bonds the three layers together. Such a blank can be prepared as shown in the Examples that follow.

Figure 1A:
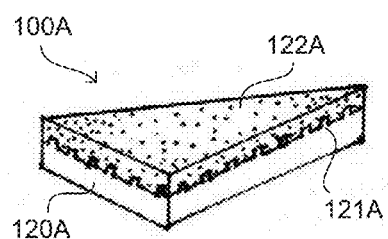
FIG. 1A, is a schematic drawings of a triangular segment 100A, showing abrasive layer 122A, metal mesh layer 121A and a substrate layer 120A.
Figure 1B:
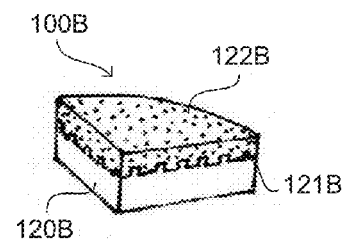
FIG. 1B, is a schematic drawings of a pie-shaped segment 100B, showing abrasive layer 122B, metal mesh layer 121B and a substrate layer 120B.
Figure 1C:
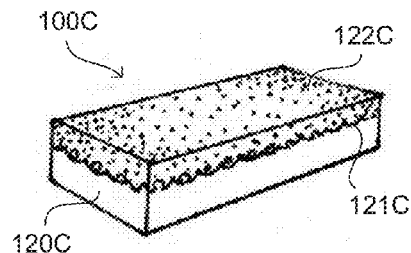
FIG. 1C, is a schematic drawings of a rectangular segment 100C, showing abrasive layer 122C, metal mesh layer 121C and a substrate layer 120C.

FIGS. 1A through 1C show perspective views of partial or cut segments of the blank 100 of FIG. 1 and will be illustrated by using the same numbers for the various analogous layers and further identified by A, B or C to conform to the respective Figure.

FIG. 1A shows a triangular shaped segment 100A that can be bonded onto a working tool by welding or similar means. Segment 100A has a cemented tungsten carbide substrate layer 120A, an opposing abrasive PCD or PCBN layer 122A and an intermediate metal mesh stress reducing layer 121A containing PCD or PCBN in the apertures and infiltrated by cobalt when sintered to the abrasive and substrate layers.

Similarly FIG. 1B shows a pie shaped segment 100B that can be bonded onto a working tool by welding or similar means. Segment 100B has a cemented tungsten carbide substrate layer 120B, an opposing abrasive PCD or PCBN layer 122B and an intermediate metal mesh stress reducing layer 121B containing PCD or PCBN in the apertures and infiltrated by cobalt when sintered to the abrasive and substrate layers.

FIG. 1C shows a rectangular segment 100C that can be bonded onto a working tool by welding or similar means. Segment 100C has a cemented tungsten carbide substrate layer 120C, an opposing abrasive PCD or PCBN layer 122C and an intermediate metal mesh stress reducing layer 121C containing PCD or PCBN in the apertures and infiltrated by cobalt when sintered to the abrasive and substrate layers. Any number of segment shapes can be cut from a corresponding blank to form a desired segment for a particular working tool.

Figure 2:
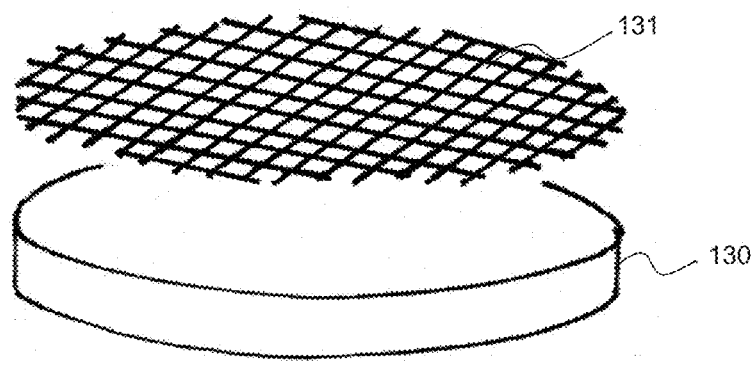
FIG. 2 is an exploded view of a substrate 130 having a metal mesh layer 131 positioned above a surface area of the substrate.

FIG. 2 is an exploded view of a tungsten carbide substrate layer 130 and a mesh layer 131. FIGS. 2A through 2F are partial views showing various exemplary metal mesh and aperture configurations.

Figure 2A:
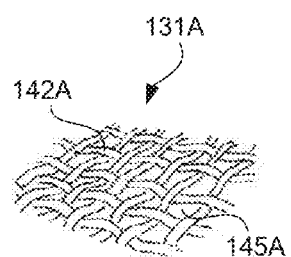
FIGS. 2A through 2F are views of metal mesh layers of various configurations and aperture shapes.

FIG. 2A is a view of a metal mesh layer 131A comprising a network made up of woven strands 142A and having a pattern of relatively uniform square apertures 145A.

Figure 2B:
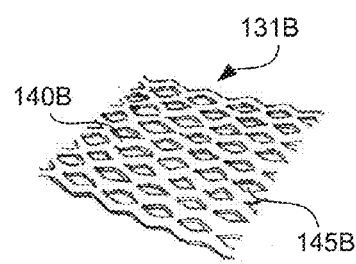
Figure 2C:
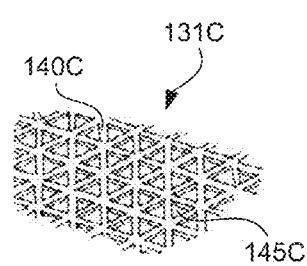

FIG. 2B is a view of a metal mesh layer 131B comprising a single sheet network 140B and having a pattern of diamond shaped apertures 145B FIG. 2C is a view of a metal mesh sheet 131C comprising a single sheet network 140C and having a pattern of triangular apertures 145C.

Figure 2D:
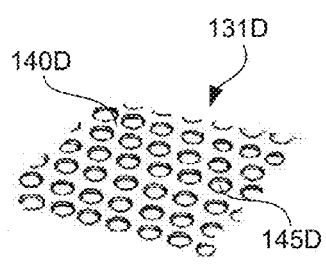

FIG. 2D is a view of a metal mesh sheet 131D comprising a single sheet network 140D and having a pattern of round apertures 145D.

Figure 2E:
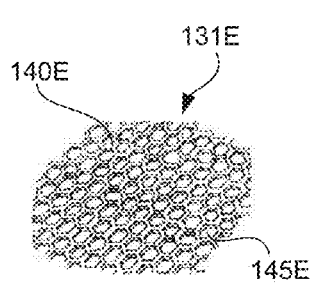

FIG. 2E is a view of a metal mesh sheet 131E comprising a single sheet network 140E and having a pattern of hexagonal apertures 145E.

Figure 2F:
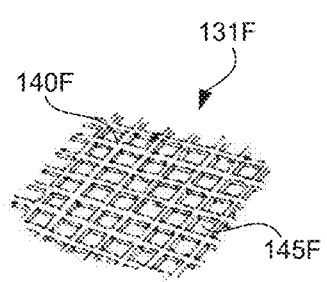

FIG. 2F is a view of a metal mesh sheet 131F comprising a single sheet network 140F and having a pattern of square apertures 145F.

Figure 3A:
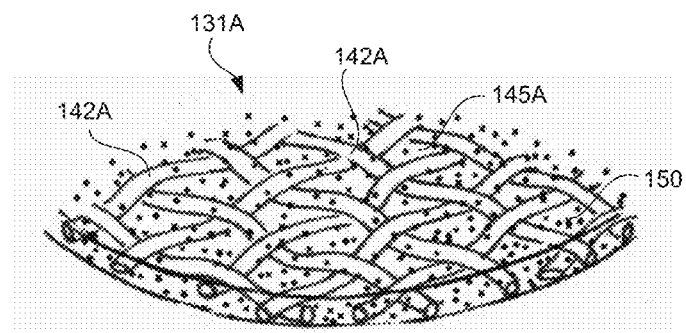
FIG. 3A if a partial view of a metal mesh layer 131A of FIG. 2A having a network of cross woven strands 142A forming apertures 145A having abrasive particles 150 in the mesh apertures.

FIG. 3A is a partial view of the metal mesh layer 131A of FIG. 2A comprising a network made up of woven strands 142A having a pattern of relatively square apertures 145A and showing particles of PCD or PCBN 150 to be contained within apertures 145A.

Figure 3B:
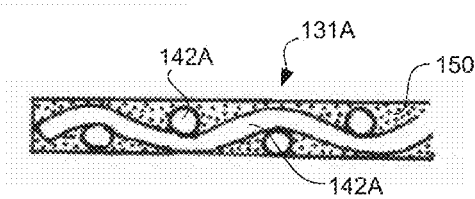
FIG. 3B is a cross sectional view of metal mesh layer 131A, of FIG. 3A showing apertures 145A filled with abrasive particles 150.

FIG. 3B is cut away or sectional side view of mesh layer 131A showing woven strands 142A wherein apertures 145A (not specifically identified) are filled with PCD or PCBN particles 150.

Figure 4A:
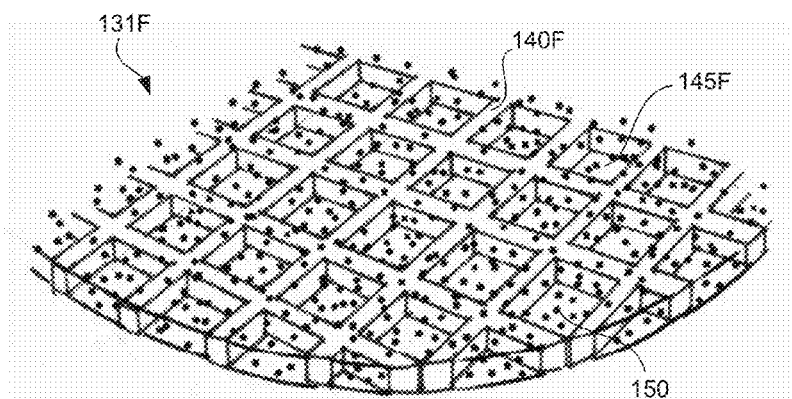
FIG. 4A if a partial view of a metal mesh layer 131F of FIG. 2F having a solid mesh network 140F containing square apertures 145F having abrasive particles 150 in the mesh apertures.

FIG. 4A is a partial view of the metal mesh sheet 131F of FIG. 2F comprising a network 140F having a pattern of relatively square apertures 145F and showing particles of PCD or PCBN 150 to be contained within apertures 145F.

Figure 4B:
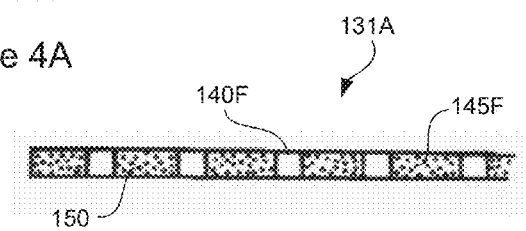
FIG. 4B is a cross sectional view of metal mesh layer 131F, of FIG. 4A showing apertures 145F filled with abrasive particles 150.

FIG. 4B is cut away or sectional side view of mesh layer 131F showing the network 140F wherein apertures 145F are filled with PCD or PCBN particles 150.

The above examples of mesh are merely exemplary and variations in shape, size and configuration can be made consistent with the disclosure herein. However, the mesh area does not occupy the entire surface area between the abrasive and substrate layers to be joined. The mesh occupied area is typically from about 40% to about 70%, of surface area between these layers, and often about 40%. Further, the metal mesh can typically have a thickness less than the superabrasive layer. In some cases the mesh can extend from about 5% to about 25% of the thickness of the superabrasive layer, although from about 10% to about 60% can also be used. The mesh openings can typically range from 0.05 mm to 2 mm in width, and often from 0.2 mm to 0.6 mm although other widths can be used.

The following examples illustrate processes for the preparation of PCD or PCBN blanks comprising an abrasive layer of PCD or PCBN, an intermediate stress stabilizer layer comprising a metal mesh containing PCD or PCBN in the mesh apertures and an opposing substrate layer, typically formed of cobalt containing tungsten carbide, wherein these layers are interconnected by being sintered under HPHT conditions. The PCD or PCBN blanks are also illustrated.

Example 1

A cleaned tantalum cup is prepared and 8 grams of cleaned (fired at 1050° C. for 2 hours in a hydrogen gas atmosphere) fine diamond powders of 8-12 microns size are loaded into the bottom of the cup. The diamond powder is then packed well by tamping, shaking, and pushing with a stainless steel spoon. Next an assembly of metal mesh/cobalt cemented tungsten carbide round disc (13-16 wt. % cobalt content) is made by spot welding a piece of metal mesh (having the same diameter as the tungsten carbide disc and 0.12 mm thick) on the surface of tungsten carbide disc. The metal mesh is a molybdenum wire woven mesh of 0.12 mm diameter and having a pore size of 0.40×0.40 mm. The mesh may be pure molybdenum or may contain a trace of other transient metals. The assembled metal mesh/tungsten carbide disc is placed on top of the packed diamond powder of the tantalum cup with the metal mesh being interfaced with the diamond powder. The reaction cup-assembly is completed by closing of the tantalum cup.

The completed reaction cup-assembly is loaded into an HPHT cell assembly and subjected to a temperature of 1,400° C. at a pressure of 55 kilobars for 20 minutes. The resulting as-pressed PCD is taken out of the pressed cell-assembly and finished to a round PCD blank by conventional OD-grinding, lapping, surface-grinding, and polishing of the PCD surface. The bowing of the new 1.60 mm thick 52 mm round PCD blank is first examined to compare with a standard type (with no metal mesh) PCD blank. It is observed the bowing of PCD blank is slightly smaller than a conventional PCD blank.

The finished PCD round blank is wire EDM cut into half and further into several segments to examine the cross-sectional area of PCD blank for observation of the microstructure of the tungsten carbide layer, the metal-mesh layer, and the PCD layer at the interfaces thereof. All observations are normal and no cracks, fractures or any abnormal microstructural appearance is observed. Representative structures are illustrated in FIGS. 1 through 1C.

Example 2

The same procedure as in Example 1 is followed for making PCBN blank with a wire woven molybdenum mesh interface placed at the PCBN/tungsten carbide interface as in Example 1. The same tantalum reaction cup assembly is prepared including a sheet of wire woven molybdenum mesh welded on the surface of tungsten carbide substrate disc. A CBN powder feedstock including its binder materials is loaded in the Ta-cup followed by powder packing as in Example 1. The tungsten carbide substrate with wire mesh combination is then loaded on top of the packed CBN powder layer and a complete reaction-cup assembly is finished by clamping the Ta cup.

This PCBN reaction-cup assembly is then loaded into the final HPHT cell assembly and subjected to similar pressure and temperature as in Example 1 in the HPHT press for about 20 minutes pressing cycle time. The resulting as-pressed PCBN blank is taken out of the pressed cell and followed by a normal finishing operation as applied in Example 1. Finally, a polished PCBN blank is obtained with no physical damage (cracks, chips, fractures, poorly bonded surface texture, etc.) around the OD and PCBN top surface area of the PCBN blank. From observation the bowing of PCBN blank appears to be normal but the bowing degree appears to be a bit less than a conventional PCBN blank with no metal mesh interface layer.

The blank is then cross sectioned by wire EDM to examine the cross-sectional area of PCBN exhibiting the layer of PCBN, interface metal mesh area, and the tungsten carbide substrate layer. From visual observation there appears to be excellent bonding of the metal mesh layer in between the tungsten carbide substrate and the abrasive PCBN layer. There are no apparent signs of damage, cracks or delamination anywhere in the vicinity of metal mesh interface layer of either the tungsten carbide substrate layer or the abrasive PCBN layer.

In order for checking the stress field around the metal mesh area, the wire EDM segment is further cut into the different segment shapes and each segment is then brazed at a temperature of up to 690° C. into ordinary steel tool bodies for examining any degree of its fracture failure. No delamination or any thermally induced cracks around the interface of the metal mesh stress reducing layer between the tungsten carbide and PCBN layers are observed and also no cracking, chipping or fracturing on the top surface of PCBN layer is observed.

Example 3

The similar cup assembly is prepared as in Examples 1 and 2 but using a thicker tungsten carbide substrate disc as well as using a thicker or taller PCD layer material prepared. The tungsten carbide substrate disc having a thickness of 8 mm and a diameter of 54 mm and a taller molybdenum mesh having a height or thickness of 1.25 mm height are assembled as in Example 1. First, an assembly of tungsten carbide disc attached with molybdenum mesh is fitted into the bottom of a Ta cup. Following this there is loaded 230/270 mesh diamond powder up to the ¾ of the height of the metal mesh followed by loading a trimodal fine diamond feed consisting of 25-35 microns as a main size with 8-12 microns and 4-6 microns diamond powder as minor sizes to a cup height of up to 5-6 mm more on top of the coarser diamond layer.

The cup is closed and placed in an HPHT press and subjected to a temperature of 1400° C. at a pressure of 55 kilobars for 30 minutes.

The resulting as-pressed PCD blank is taken out of the HPHT press and finished for the purpose of a drill bit cutter to be utilized in oil and gas drilling applications.

No cracks are shown and the 3-3.5 mm thick sintered diamond layer appears to be in well sintered PCD as inspected by visual observation after finishing process is complete. A simple turning test against a granite bar is conducted along with standard type of drill bit PCD cutters and no major differences in wear pattern or cutting performance is observed between two different cutters.

It is to be understood that the above-described arrangements are only illustrative of the application of the principal of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

The invention claimed is:

1. A multi-layer polycrystalline superabrasive blank for attachment to a working tool, said blank comprising:
    (a) a tungsten carbide support substrate layer containing cobalt;
    (b) a superabrasive polycrystalline working layer adjacent the support substrate layer and having an interface between the superabrasive polycrystalline working layer and the support substrate layer, and
    (c) a metal mesh stress stabilizer layer sintered at the interface between and bonded to said support substrate layer and superabrasive polycrystalline working layer, said metal mesh stress stabilizer layer including apertures and wherein the superabrasive polycrystalline working layer has a working layer thickness measured along a normal to the interface between an outermost working layer surface and the interface and the metal mesh stress stabilizer layer has a stabilizer thickness measured along the normal to the interface between a topmost metal mesh stress stabilizer surface and the interface wherein the stabilizer thickness is 5% to 60% of the corresponding adjacent working layer thickness of the superabrasive polycrystalline working layer.

2. A multi-layer polycrystalline blank according to claim 1 wherein the superabrasive polycrystalline working layer comprises polycrystalline diamond (PCD) or polycrystalline cubic boron nitride (PCBN).

3. A multi-layer polycrystalline blank according to claim 2 wherein said metal mesh stress stabilizer layer contains PCD or PCBN sintered in the apertures thereof further bonded to said support substrate layer and said superabrasive polycrystalline working layer.

4. A multi-layer polycrystalline blank according to claim 3 wherein the metal mesh stress stabilizer layer comprises a carbide former selected from the group consisting of groups IVA, VA, VIA, or alloys thereof.

5. A multi-layer polycrystalline blank according to claim 4 wherein the cobalt from the support substrate layer is infiltrated into the metal mesh stress stabilizer layer and the superabrasive polycrystalline working layer.

6. A multi-layer polycrystalline blank according to claim 1 wherein said metal mesh stress stabilizer layer comprises a member selected from the group consisting of molybdenum, tungsten, tantalum, and combinations thereof.

7. A multi-layer polycrystalline blank according to claim 6 wherein the metal mesh stress stabilizer layer comprises at least one of molybdenum and tungsten.

8. A multi-layer polycrystalline blank according to claim 1 wherein the mesh stress stabilizer layer occupies between about 40 to 70% of a surface area of the interface between the superabrasive polycrystalline working layer and the support substrate layer.

9. A multi-layer polycrystalline blank according to claim 1 wherein the apertures of the metal mesh stress stabilizer layer have a width of 0.05 mm to 2 mm.

10. A multi-layer polycrystalline blank according to claim 1 wherein the metal mesh stress stabilizer layer comprises a first metal mesh stress stabilizer layer and a second metal mesh stress stabilizer layer adjacent the first metal mesh stress stabilizer layer wherein both the first metal mesh stabilizer layer and the second metal mesh stress stabilizer layer are sintered at the interface between and bonded to said support substrate layer and superabrasive polycrystalline working layer.

11. A multi-layer polycrystalline blank according to claim 10 wherein the cobalt from the support substrate layer is infiltrated into both of the metal mesh stress stabilizer layers and the superabrasive polycrystalline working layer.

12. A multi-layer polycrystalline blank according to claim 1 wherein the stabilizer thickness is 10% to 60% of the working layer thickness of the superabrasive polycrystalline working layer.

13. A multi-layer polycrystalline blank according to any one of claims 1-11 having a working abrasive tool attached thereto.

14. A multi-layer polycrystalline blank according to claim 1 wherein the stabilizer thickness is 5% to 25% of the working layer thickness of the superabrasive polycrystalline working layer.

* * * * *